US012578228B2

(12) United States Patent
Dubois

(10) Patent No.: US 12,578,228 B2
(45) Date of Patent: Mar. 17, 2026

(54) MINIATURIZED STEREOSCOPIC THERMAL SENSOR FOR AN AUTOMATIC COUNTING DEVICE

(71) Applicant: KIOMDA, Saint Michel en Greve (FR)

(72) Inventor: Jean-Claude Dubois, St Michel en Greve (FR)

(73) Assignee: KIOMDA, Bordeaux (FR)

( * ) Notice: Subject to any disclaimer, the term of this patent is extended or adjusted under 35 U.S.C. 154(b) by 1069 days.

(21) Appl. No.: 17/791,410

(22) PCT Filed: Jul. 31, 2020

(86) PCT No.: PCT/EP2020/071618
§ 371 (c)(1),
(2) Date: Jul. 7, 2022

(87) PCT Pub. No.: WO2021/019065
PCT Pub. Date: Feb. 4, 2021

(65) Prior Publication Data
US 2023/0366737 A1 Nov. 16, 2023

(30) Foreign Application Priority Data
Jul. 31, 2019 (FR) ...................................... 1908784

(51) Int. Cl.
*G01J 5/00* (2022.01)
*G01J 5/0806* (2022.01)
(Continued)

(52) U.S. Cl.
CPC ........... *G01J 5/0025* (2013.01); *G01J 5/0022* (2013.01); *G01J 5/0806* (2013.01); *G01J 5/0831* (2013.01); *G01J 5/34* (2013.01)

(58) Field of Classification Search
CPC ...... G01J 5/0025; G01J 5/0806; G01J 5/0831; G01J 5/0022
See application file for complete search history.

(56) References Cited

U.S. PATENT DOCUMENTS 5,519,784 A * 5/1996 Vermeulen ............. G06V 40/20
382/100
5,818,337 A 10/1998 Erismann
(Continued)

FOREIGN PATENT DOCUMENTS

| CN | 109686113 | 4/2019 |
| EP | 3450944 | 8/2017 |

(Continued)

OTHER PUBLICATIONS

Canadian Search Report dated Sep. 13, 2023.
(Continued)

*Primary Examiner* — Chih-Cheng Kao
(74) *Attorney, Agent, or Firm* — IPSILON USA, LLP

(57) ABSTRACT

The subject matter of the present invention concerns a sensor for counting and/or determining the direction of passage of objects and/or living beings, each having a thermal signature, comprising or consisting of:
  a pyroelectric component, preferably digital, integrating at least two pairs of detection cells; and
  one cell of which is masked in each pair of cells.
The present invention further concerns a mechanical passage collecting unit comprising such a sensor and an optical lens. The present invention further concerns the use of such a sensor, for example in the form of a mechanical passage collecting unit, in a device. The present invention concerns the device as such. The present invention also concerns the sensor data processing algorithm.

13 Claims, 3 Drawing Sheets

(51)  Int. Cl.
  G01J 5/0831      (2022.01)
  G01J 5/34       (2022.01)

(56)            References Cited

U.S. PATENT DOCUMENTS

2010/0225486 A1 *  9/2010  Dubois ................... G07C 9/00
                                        340/573.1
2019/0323897 A1 * 10/2019  Wang ................... G01J 5/0025
2024/0183719 A1 *  6/2024  Alessi ..................... G01J 5/05

FOREIGN PATENT DOCUMENTS

| FR | 2899003 | 3/2006 |
| FR | 3099591 | 2/2021 |
| WO | 94/08258 | 4/1994 |
| WO | 01/88858 | 11/2001 |
| WO | 2010069002 | 6/2010 |

OTHER PUBLICATIONS

FR190874 (FR Patent No. 3099591)—Notice of Publication Jan. 23, 2021.
FR190874 (FR Patent No. 3099591)—Notice of Allowance Dec. 13, 2021.
FR190874 (FR Patent No. 3099591)—Notice of Issue Jan. 15, 2022.
Translation of issued claims for FR 3099591.
Pending Claims U.S. Appl. No. 17/791,410 current at the time of this IDS.
International Search Report dated Oct. 7, 2020.

* cited by examiner

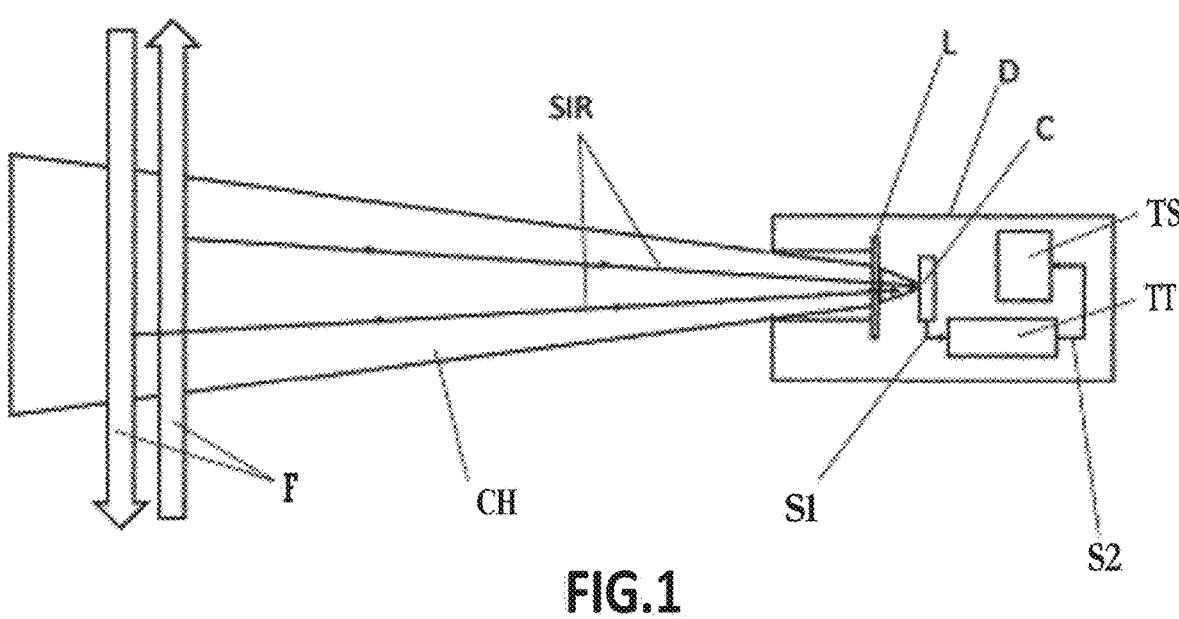
FIG.1
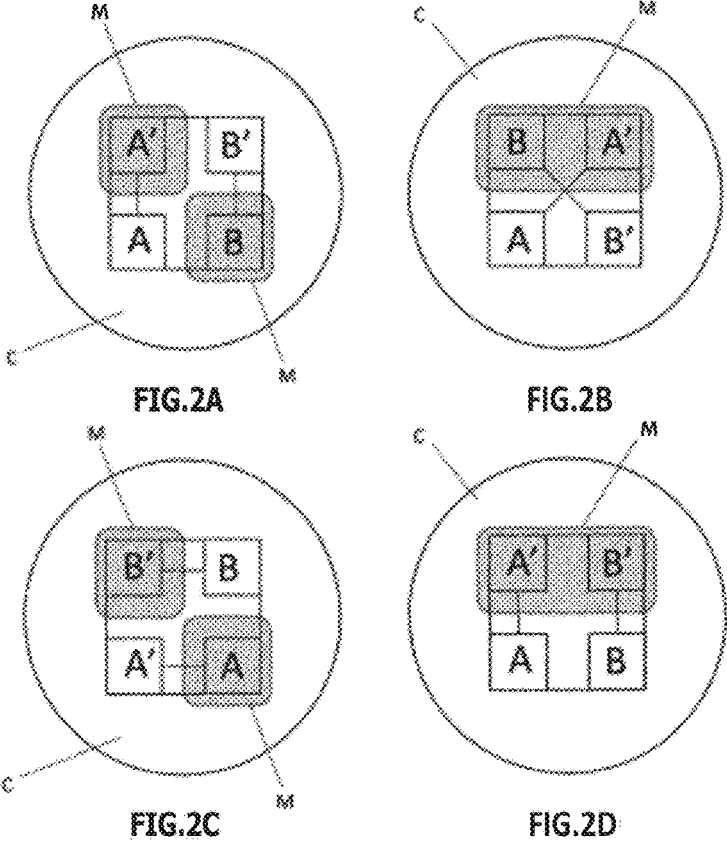
FIG.2A           FIG.2B
FIG.2C           FIG.2D

MINIATURIZED STEREOSCOPIC THERMAL SENSOR FOR AN AUTOMATIC COUNTING DEVICE

RELATED APPLICATION

This application is a National Phase of PCT/EP2020/071618 filed on Jul. 31, 2020, which claims the benefit of priority from French Patent Application No. 19 08784, filed on Jul. 31, 2019, the entirety of which are incorporated by reference.

FIELD OF THE INVENTION

The subject matter of the present invention concerns a sensor for counting and/or determining the direction of passage of objects and/or living beings each having a thermal signature, and the use of such a sensor in a device. The subject matter of the present invention also concerns the device as such and the sensor data processing algorithm.

DESCRIPTION OF THE RELATED ART

Counting devices, in particular people counting devices, generally seek to obtain the greatest possible measurement precision. Thus, the state of the art is rich in teaching as to proposing means to determine the direction of passage of the counted entities, or even to distinguish the nature of the entity (living being, object, vehicle, etc.) in order to possibly discriminate unwanted entities. In general, to obtain the best results in terms of reliability, the state of the art has increased the number of counting means arranged on a passage space to "screen" the considered zone. For example, a multitude of beams/sensors placed in a particular passage zone makes it possible to study the movements of the entities considered and therefore to increment or not the count. This results in heavy infrastructure that is very difficult or even impossible to move. The patent documents WO0033261, EP0828233, WO9408258, FR2739203, WO9816801, U.S. Pat. No. 4,278,878, WO01/88858, U.S. Pat. No. 4,000,400, FR2644269, US2018046860 illustrate this type of embodiment.

OBJECTS AND SUMMARY

The subject matter of the present invention is to propose a sensor allowing to collect a maximum of information and thus to simplify the counting infrastructures. The sensor can thus become a sensor for counting and/or determining the direction of passage of objects and/or living beings, each having a thermal signature. The subject matter of the present invention also aims to propose a device comprising such a sensor, and to provide an algorithm allowing the implementation of the data obtained by this particular sensor.

SUMMARY

The subject matter of the present invention concerns a sensor for counting and/or determining the direction of passage of objects and/or living beings, each having a heat signature, comprising or consisting of:

a pyroelectric component, preferably digital, integrating at least two pairs of detection cells; and
one cell of which is masked in each pair of cells.

The subject matter of the present invention also concerns a mechanical unit for collecting passages, characterized in that it comprises:

at least one sensor according to the present invention; and
at least one optical lens, advantageously adapted to the thermal infrared signal, such as a Fresnel lens, a germanium lens or a zinc selenide lens, placed in front of the pyroelectric component of said sensor.

The subject matter of the present invention thus concerns the use of at least one sensor according to the present invention, for example integrated in a mechanical unit for collecting passages as defined above, in a counting device and for determining the direction in which objects and/or living beings each have a thermal signature, in which the sensor is preferably stereoscopic, that is to say operates stereoscopically.

The subject matter of the present invention also concerns a device for counting and determining the direction of passage of objects and/or living beings, each having a heat signature, comprising:

at least one sensor according to the present invention, for example integrated in a mechanical unit for detecting passages as defined above;
a power supply means;
optionally a marking specifying the upper side of the device and optionally a marking indicating the detection field of said device and/or the direction of passage of said objects and/or living beings; and
at least one processing unit adapted to determine the number and/or to determine the direction of passage of each object and/or living beings having a thermal signature passing in front of said device.

The subject matter of the present invention also concerns an algorithm for implementing a sensor according to the present invention, for example integrated into a mechanical unit for collecting passages as defined above, or a device according to the present invention comprising such a sensor, characterized in that the following steps are applied by said algorithm:

a first step (a) where all the detection variables are initialized to zero, including the number of passages;
where applicable, a step (b) corresponding to the acquisition and processing of the data generated during the passage of an object and/or a living being having a thermal signature in front of the sensor with a positive or negative assignment of a passage unit by passage of an object and/or a living being having a thermal signature in front of said sensor;
optionally, a step of comparison of the absolute data and the derivatives of two curves of similar shapes and coming from the same sensor;
a step (c) of adding or subtracting from the number of passages in memory of a unit according to the assignment of step (b);
where applicable, a step (d) of reproducing steps (b) and (c); and
optionally at least one step (e) of data storage with optionally a zero resetting of the variables at each storage.

The subject matter of the present invention concerns the use of at least one device further comprising a magnetometer and a sensor according to the present invention to determine the direction of passage of at least one object comprising or consisting of metal generating at a magnetic field or sensitive to a magnetic field.

The subject matter of the present invention further concerns the use of at least one sensor as described here, to determine the direction of passage of at least one vehicle, such as a bicycle or an automobile.

The subject matter of the present invention further concerns the use of at least one sensor as described presently, to determine the direction of passage of at least one human being.

Definitions

A "sensor", in the context of the present invention, is an optoelectronic component sensitive in the infrared ("IR") allowing an optical signal (IR) to be transformed into an electrical signal, preferably the electrical signal is of a digital nature. In the context of the present invention, this optoelectronic component consists of at least two pairs of detection cells. The "sensor" according to the present invention is, as its name indicates, passive, that is to say that it only receives external infra-red signals and does not emit any by itself in the purpose of collecting the reflected/absorbed waves due to this emission by the "objects and/or living beings" passing in front of said sensor.

Each pair of detection cells comprises a first and a second detection cell, one similar to the other, advantageously arranged side by side. Each detection cell is capable of delivering an electrical signal, preferably digital. Thus by "two pairs of detection cells", it is understood in the context of the present invention a set of four cells.

By "masking", it is understood in the context of the present invention any type of material blocking the passage of electromagnetic rays and more particularly of IR rays. Thus, the masking can be considered mechanical.

By "device for counting and determining the direction of passage of objects and/or living beings each having a thermal signature", it is understood in the context of the present invention a device for measuring the passage in a particular delimited zone of a number of entities, such as living beings, more particularly humans (men and/or women), or mobile objects, more particularly vehicles. By vehicle, it is understood any vehicle for the transport of people, animals or freight, loaded or empty, such as cars, trucks, motorcycles, bicycles, etc.

By "processing unit", it is understood in the context of the present invention an element allowing the processing of data, that is to say capable of recovering the signals coming from the sensor, processing them to make data which can then be transmitted to means of storage and/or data transfer. The processing unit also advantageously performs its tasks in a time-organized manner via a clock (internal or external to said unit) and can be programmed to apply a processing algorithm to the data collected.

By "thermal signature", it is understood in the context of the present invention that the object or living being (such as a person) distinguished itself from its environment by a characteristic thermal trace.

By "stereoscopic", it is understood in the context of the present invention a system making it possible to distinguish in a determined space the objects/living beings, which implies at least two distinct signals for the same object in the same space (and therefore two different signal sources/cells).

By "power supply means", it is understood in the context of the present invention a means of electric power supply or equivalent.

By "passage field", it is understood within the scope of the present invention the zone where the frequentation (i.e., the passage of entities as defined above) is to be determined. This space of passage can be segmented into several "parcels of passage". In each of these plots is then positioned a device according to the present invention, so that the passage takes place effectively in front of the sensor.

By "derivative", it is understood within the scope of the present invention a discrete digital derivative as known in the state of the art of signal processing.

DETAILED DESCRIPTION

In a particular embodiment, the sensor according to the present invention is characterized in that each pair of cells comprises a reference cell, masked, and a detection cell, not masked.

Preferably, the sensor according to the present invention is characterized in that the reference cells are side by side, preferably the masking of these then consists of a single continuous piece.

In an advantageous embodiment, the sensor according to the present invention is characterized in that it is configured to be combined with at least one optical lens, advantageously adapted to the thermal infrared signal, such as a Fresnel lens, a germanium lens or a zinc selenide lens, placed in front of said pyroelectric component. The combination of the sensor according to the present invention with a lens thus makes it possible to use the stereoscopy generated by the latter at its focal point for the acquisition of useful data for counting. Such a combination of the sensor according to the present invention with a lens can be defined as a "mechanical passage collecting unit". Such a unit makes it possible to count and discriminate the direction of the passages of objects or living beings having a thermal signature.

Preferably, the sensor according to the present invention is characterized in that the detection cells are arranged to be in the focal plane of the optical lens, or the lens-sensor couple is adjusted so that the detection cells are close to the focal plane. By adjusted, it is understood that it is the distance between the lens and the sensor that is adjusted. Indeed, this adjustment is common in the art so that the image received on the detection cells is sharp, i.e., that the focusing is done.

Thus the present invention also concerns a mechanical unit for capturing passages as described above, characterized in that the detection cells of said sensor are in the focal plane of the optical lens or the lens and the sensor are adjusted so that the detection cells of the sensor are close to the focal plane of the lens.

In addition, the subject matter of the present invention concerns a device comprising a sensor as defined above, for example in a mechanical passage-collecting unit as defined above.

Preferably, the device according to the present invention comprises a single sensor according to the invention, for example in a mechanical passage capture unit as defined above.

Thus, advantageously, a device according to the present invention comprising the sensor according to the present invention (for example integrated into a mechanical unit for capturing passages as defined above), can be functional with a single sensor according to the invention. Thus, the electromagnetic radiation collected allow a counting and if necessary, a determination of the direction of passage of objects or living beings having a thermal signature in front of said sensor.

Thus in a particular embodiment, the device according to the present invention is characterized in that it comprises at least one data transmission means.

Preferably, the device according to the present invention is characterized in that it comprises at least one data storage means.

Conventionally, the device according to the present invention is characterized in that the power supply means is external to the device, such as through a power outlet, and/or internal to the device, such as through a battery or an accumulator.

The subject matter of the present invention also concerns an algorithm for implementing a sensor according to the present invention, or a device according to the present invention comprising such a sensor, characterized in that the steps as described above are applied by said algorithm.

In particular, step (b) of the algorithm may comprise the following sub-steps:

a step (b1), subsequent to the previous step (for example subsequent to step (a), or even another step (b)) where the algorithm assigns to the first significant signal received coming from the sensor and corresponding to the start of a detection, a first reference time (t0) and identifies the cell from which this signal originates;

where applicable, a step (b2), subsequent to the previous step (b1) where the algorithm assigns to the significant signal received in a directly neighboring pair of cells of the previous step (b1), a subsequent reference time (t1) and identifies the cell from which this signal originates;

where applicable, a step (b3), subsequent to or parallel to any one of the preceding steps (b1) or (b2), where the algorithm assigns to the extreme value of the signal received from the sensor, corresponding to the detection peak, a reference time (t00) and identifies the cell from which this signal originates;

where applicable, a step (b4), subsequent to the previous step (b4) where the algorithm assigns to the detection peak received in a directly neighboring pair of cells of the previous step (b3), a subsequent time reference (t01) and identifies the cell from which this signal originates;

where applicable, a step (b5), subsequent to the previous step (b4) where the algorithm identifies the loss of signal and closes step (b) by assigning a positive or negative passage direction by comparing the first and the last cell from which the signals originate and optionally keeps in memory the characteristics of this passage.

The assignment of the direction of passage can be arbitrarily defined on the sensor and/or the device according to the present invention, or by the user by means of assignment such as a directional button or in a control software setting, or by the algorithm during the step for example of step a) of reinitialization. Thus, since the sensors according to the present invention are stereoscopic, and advantageously placed so that the object(s)/living beings pass in front of a first pair of cells then a second, it becomes very easy to determine the direction of passage.

In an optional manner, the algorithm can estimate the speed of passage if the user gives it the real distance between the sensor and the middle of the passage zone of thermal objects/living beings.

Moreover and optionally, the algorithm can estimate the thermal width of the object or group of objects crossing the detection field thanks to the calculated speed, by comparing the difference in time references between the start of detection t0 and the detection of the first extremum signal t00 (respectively t01).

By "thermal width", it is understood in the context of the present invention that the algorithm can deduce approximately, based on the speed, and the distance at which the object is, its size. It is then possible to assign identifications to the different signals collected depending on whether they are people, animals, people on bicycles, cars, etc.

The algorithm can thus estimate the thermal width of the object or group of objects or living beings crossing the detection field thanks to the calculated speed, by comparing the difference in time references between the start of detection t0 and the detection of the first extremum signal t00 (respectively t01), as explained above.

Moreover and optionally, the algorithm can use, in the same signal acquisition, the estimated speed, the number of detected signal extrema and the thermal half-width of the first object to classify the practices detected by the device (pedestrian, two wheels vehicles, vehicles, etc.).

In a particular embodiment, the device according to the present invention may also comprise at least one magnetometer.

In a typical way according to the present invention, when the algorithm detects that a series of detection peaks has crossed the matrix of cells from side to side, it adds a whole unit to the number of passages, depending on the direction of passage detected.

In a particular embodiment, the algorithm according to the present invention can be characterized in that said algorithm is integrated into a mechanical passage capture unit according to the present invention, or a device according to the present invention comprising such a sensor.

BRIEF DESCRIPTION OF THE FIGURES

FIG. 1 represents a device (D) according to the present invention comprising a sensor (C) according to the present invention, a lens (L), a processing unit (TT) and a transmission unit (TS). The direction of passage of the moving thermal targets is represented by the arrows (F), and the device is arranged so that this passage crosses the detection field (CH). The thermal targets emit infrared signals (SIR) which are detected by the sensor (C) after their passage through the lens (L). The sensor then sends an analog or digital signal (S1) to the processing unit (TT) which processes the signal so that it can be used by the transmission unit (TS)—and/or storage if applicable. The transmission unit (TS) transmits the useful information according to its designated protocol. In a preferred manner, the device comprises a single sensor (IR) according to the present invention (comprising for example 2×2 detection cells, such as 2×2 pixels), placed in the focal plane or close to it of the lens (L), which can be an IR lens (Fresnel, germanium or even zinc selenide lens, for example).

FIG. 2 represents a sensor (C) according to the present invention, comprising 2×2 detection cells A/A' and B/B'. Four embodiments are represented below in FIG. 2A, FIG. 2B, FIG. 2C and FIG. 2D. In FIGS. 2A and 2C, the pairs of detection cells are arranged so that the reference cells (A' and B for 2A, or A and B' for 2C) are not one next to each other, whereas in FIGS. 2B and 2D, the reference cells (A' and B for 2B, or A' and B' for 2D) are next to each other. In the latter cases, the hashed-greyed out masking element (M) is in one piece (allowing easy positioning and optimized masking). In FIG. 2B, the pairs A/A' and B/B' are thus said to be "crossed". In FIGS. 2A and 2C, two masking elements (M) are used. Thus, in all the cases of figures represented, the sensor can be pyroelectric integrating two pairs of detection cells, of which two masked cells serve as reference, and the two detection cells (not masked) allow a stereoscopic type of algorithm. It is important that for each detection cell, the remaining (masked) cell serves as a reference in order to have a pair-to-pair comparison basis.

DETAILED DESCRIPTION

Example 1: Created Device

Figure 3:
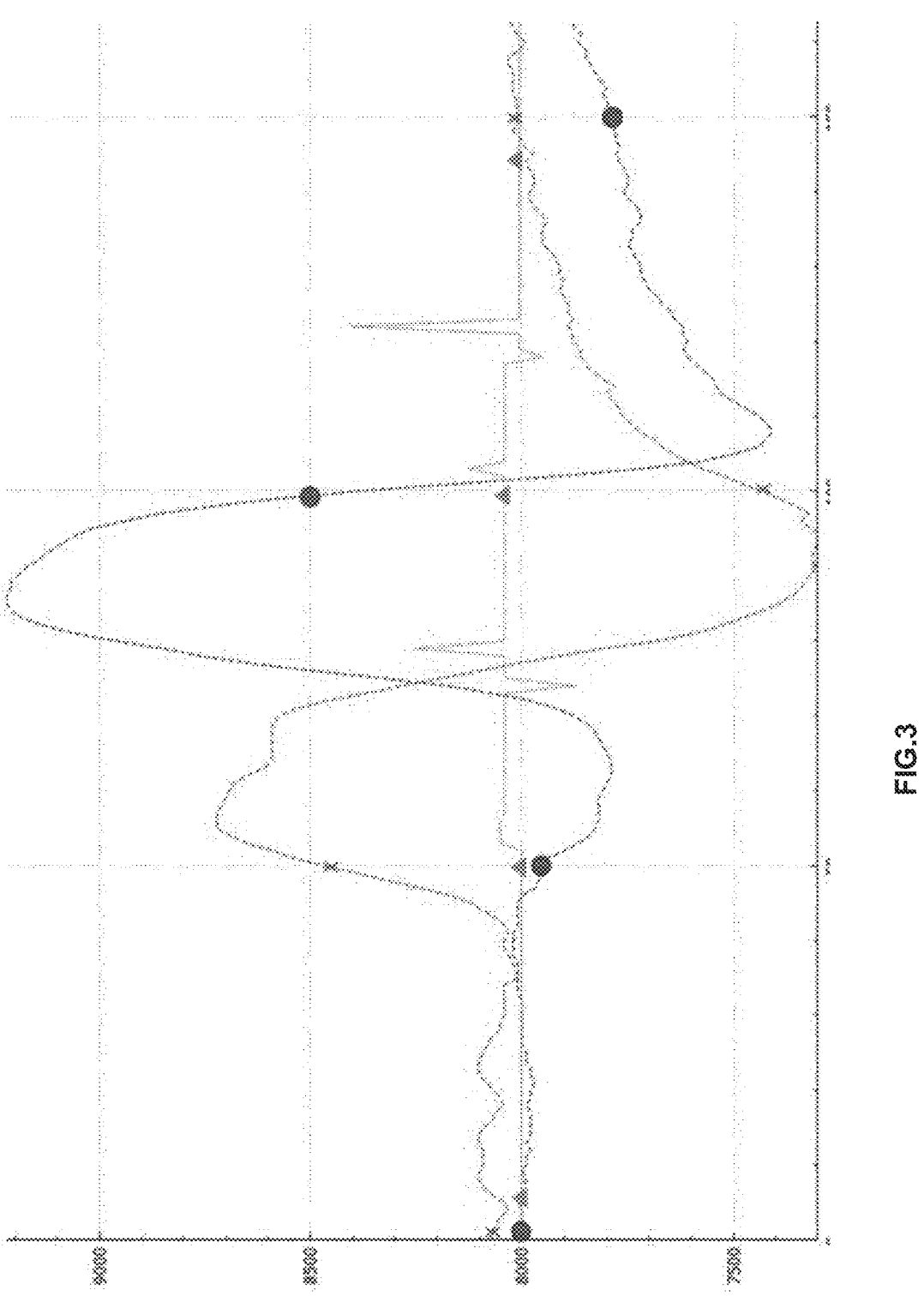
FIG. 3 represents a graph of signal intensity (in ordinates—arbitrary scale of values) in function of time (in milliseconds) when a pedestrian (slow passage) passes in front of the sensor according to the present invention (sensor according to Example 1 below). The blue and red curves respectively represent the signals obtained for a first pair of cells and a second pair of detection cells used in the sensor according to the present invention. The green curve represents the events (in the form of peaks), for example when one of the values of the blue and/or red curves reaches a threshold value (determined by the user or set by default), or when the processor has finalized an event.

A device according to the present invention was created by using the following parts:

Box: ABS casing of dimensions 101×77×40;

Weak central unit: card is built around the "MSP430F248®" microcontroller;

PYQ5848 digital matrix thermal sensor with two pairs of crossed AA' and BB' detectors. The sensor is mechanically implanted independently of the electronic board; the connection with the card is made by a wired connection of three wires;

Masking by concealment of two thermal pixels B & A' thanks to a single rectangular sticker. The two hidden pixels become the thermal references of the two remaining detectors. The two detectors provide similar thermal curves which are then compared over time using their derivatives;

Battery: CR123 NiMnO2, voltage of 3V, advertised capacity of 1500 mAHrs;

Sigfox transmission card: "SiPy®" cards (from the PyCom® manufacturer);

Internal storage of quarter-hour counting results: "I2C 24C1025®" memory;

Switch: electronic card equipped at two ends with Hall effect electromagnetic sensors.

The various elements listed above are simply assembled to obtain a device according to the present invention.

Example 2: Tested Device

Devices according to example 1 were tested according to the following protocols:

Scenario passage tests at one meter, four meters and seven meters with single passages and double passages in both directions. Video sequences associated with algorithmic data measurements were recorded using KDLINK® software for replay and analysis. Usage adjustments of the algorithm resulted in an accuracy of +/−5% on scenarios of single and grouped passages (excluding stagnation and masking).

Field tests were carried out repeatedly at the entrance/exit of the "Village Gaulois de Pleumeur-Bodou" (tourist park welcoming approximately 60,000 visitors per year), where a device according to example 1 was concealed and positioned at the entrance to the park. The obtained figures by the devices according to example 1 were compared with reference devices and with the number of paid admissions to the park.

Thus, on Aug. 15, 2018, for 1192 paying entries, the device according to example 1 recorded 1248 outward and return passages. The next day, for 921 paying entries, the sensor counted 990 outward and return passages. These figures are consistent with the fact that the sensor counts all passages and aims for an accuracy of +/−10%.

Example 3: Determination of the Nature and Direction of Passage of the Object

A first method was applied by adjusting the algorithm of the counting boxes to calculate and estimate the speed of passage of the detected targets and to classify them according to the speed the nature of the object.

Thus, the stereoscopic effect of the sensors gives types of curves of the same order.

The order of the curves makes it possible to determine the direction of passage. For example, in FIGS. 3 and 4, when the red curve (and cross) is followed by a blue curve (and circles), i.e., the peak of the blue curve appears after the peak of the red curve according to the time scale of the abscissa (on the right side of the graph here), this corresponds to a determined direction (an entry for example). When the red/blue order is reversed (i.e., the peak of the red curve is to the right of the peak of the blue curve), then this corresponds to the opposite direction. Each of these curves (red or blue) corresponds to the signal received by each pair of cells (one cell masked and the other not) sequentially.

Figure 4:
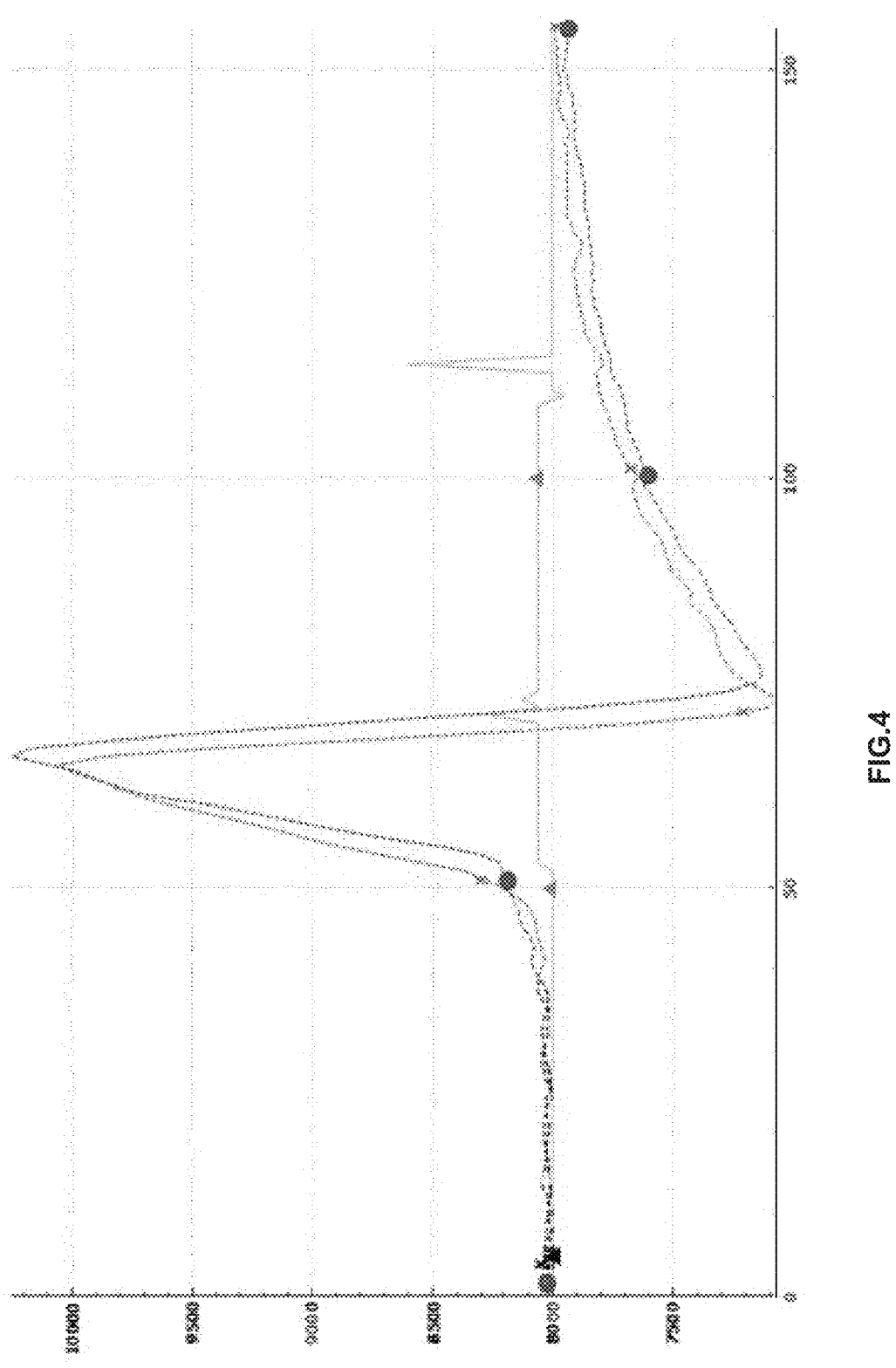
FIG. 4 represents a graph of signal strength (in ordinate—arbitrary scale of values) versus time (in milliseconds) when a vehicle such as a bicycle (fast passing) passes in front of the sensor according to the present invention (sensor according to Example 1 below). The legend and comments for FIG. 3 are applicable to FIG. 4.

The detection of the extrema is done at the passage to 0 of the two curves (see peaks on the green curves (and triangles) of the events). It is then a question of measuring the difference between the extrema to find out a speed of passage allowing to classify the type of practice. A small-time variation typically corresponds to the signal left by a vehicle such as a bicycle. The threshold can be adjustable for a variation of time left by a pedestrian. The graph in FIG. 3 is representative of the passage of a pedestrian and the graph of FIG. 4 is representative of the passage of a vehicle such as a bicycle.

Concretely, scenario tests were carried out to develop and then validate an estimate of the speed of passage. A software allowing to visualize the curves of the two sensors for each acquisition sequence and to associate to it control video sequences was used. Here, the software allowing this in the tests carried out is called "KDLINK". During these scripted tests, it was possible to reliably and repetitively classify pedestrians and bicycles, while indicating their direction of passage.

The adjustment of the sensor algorithm has been validated in the field in many cases, including a counting in Houat (France) in September 2019. This counting involved ten boxes for a full week.

A second method for determining the nature of the object passing in front of the sensor is to couple said sensor with a magnetometer making it possible to detect the passage of a metallic mass close to the sensor and to implement the management of the measurement of the magnetic sensor in the algorithm in order to specify that it is an object generating or sensitive to a magnetic field. This alone can make it possible to distinguish passages of cars in order to count only bicycles or pedestrians. This method can be combined with the first method above (from example 3), and depending on the context, one or the other method can then be favored when the data is contradictory.

In order not to compromise too much the autonomy of the device/sensor according to the present invention by the addition of a magnetometer, a particular embodiment was carried out in which the measurement period of the magnetometer was adapted in the following way:

by default, the measurement period is 500 milliseconds (consumption divided by 25) and gives the signal reference;

during thermal signal detections, this period temporarily passes to 20 milliseconds and allows metal detection to be well characterized until the end of passage detection.

A generalization can thus be made as follows:

by default, the measurement period is from 50 milliseconds to 2 seconds, for example from 100 milliseconds to 1000 milliseconds, preferably from 200 milliseconds to 750 milliseconds such as 500 milliseconds, and gives the signal reference;

during thermal signal detections, this period momentarily passes within a range of 10 to 100 milliseconds, preferably 20 or 40 milliseconds, which makes it possible to properly characterize the metal detection until the end of passage detection.

In conclusion, thanks to the paired management of the two sensors (the one according to the present invention and the magnetometer), the boxes according to the present invention remain energy autonomous and can classify the passages of vehicles (for example bicycle/car/motorcycle/truck) vs. people (e.g., bicycle/pedestrian/scooter/rollerblade on shared country roads or on cycle lanes (for bicycles)).

The invention claimed is:

1. A mechanical passage collecting unit comprising:

at least one sensor for counting and determining a direction of passage of objects and/or living beings, each having a heat signature, said at least one sensor comprising:

a pyroelectric component integrating at least two pairs of cells; and each pair of cells comprises a masked thermal reference cell and an unmasked thermal detection cell;

at least one optical lens arranged in front of the pyroelectric component of said at least one sensor;

wherein said at least two pairs of cells of the said at least one sensor are in a focal plane of the said at least one optical lens or the at least one optical lens and the at least one sensor are adjusted in such a way that the at least two pairs of cells of the at least one sensor are close to the focal plane of the at least one optical lens.

2. The mechanical passage collecting unit according to claim 1, wherein the masked thermal reference cells are side by side.

3. The mechanical passage collecting unit according to claim 1, wherein the masking of the masked thermal reference cells includes a single continuous piece.

4. The mechanical passage collecting unit according to claim 1, wherein the at least one optical lens is adapted to a thermal infrared signal.

5. The mechanical passage collecting unit according to claim 1, wherein the at least one optical lens is a Fresnel lens, a Germanium lens or a zinc selenide lens.

6. The mechanical passage collecting unit according to claim 1, wherein an operation of said at least one sensor is stereoscopic.

7. A device for counting and determining a direction of passage of objects and/or living beings, each having a heat signature, the device comprising:

at least one mechanical passage collecting unit according to claim 1;

a power supply means;

and at least one processing unit adapted to determine a number and/the direction of passage of each said objects and/or living beings.

8. The device according to claim 7, wherein said device comprises at least one data transmission means.

9. The device according to claim 7, wherein said device comprises at least one data storage means.

10. The device according to claim 7, wherein said device also comprises at least one magnetometer.

11. The device according to claim 7, wherein the device comprises a marking specifying an upper side of the device.

12. The device according to claim 7, wherein the device comprises a marking indicating a detection field of said device and/or the direction of passage of said objects and/or living beings.

13. The mechanical passage collecting unit according to claim 1, wherein the pyroelectric component is digital.

* * * * *